US012785166B2

(12) United States Patent
Chagarlamudi et al.

(10) Patent No.: US 12,785,166 B2
(45) Date of Patent: Nov. 3, 2026

(54) ACTIVE RAM AIR BATTERY WRAP

(71) Applicant: FCA US LLC, Auburn Hills, MI (US)

(72) Inventors: Venkata Krishna Mohan Chagarlamudi, Rochester Hills, MI (US); Sreekanth Surapaneni, Oakland, MI (US); Uday Kiran Mahakali, Novi, MI (US)

(73) Assignee: FCA US LLC, Auburn Hills, MI (US)

( * ) Notice: Subject to any disclaimer, the term of this patent is extended or adjusted under 35 U.S.C. 154(b) by 676 days.

(21) Appl. No.: 18/453,351

(22) Filed: Aug. 22, 2023

(65) Prior Publication Data

US 2025/0070301 A1 Feb. 27, 2025

(51) Int. Cl.
*H01M 10/625* (2014.01)
*H01M 10/613* (2014.01)
*H01M 10/6566* (2014.01)

(52) U.S. Cl.
CPC ....... *H01M 10/625* (2015.04); *H01M 10/613* (2015.04); *H01M 10/6566* (2015.04); *H01M 2220/20* (2013.01)

(58) Field of Classification Search
CPC ............. H01M 10/625; H01M 10/613; H01M 10/6566
See application file for complete search history.

(56) References Cited

U.S. PATENT DOCUMENTS 7,353,900 B2 * 4/2008 Abe ........................ B60L 50/66 180/68.5
8,647,763 B2 2/2014 Tennessen et al.
9,919,591 B2 3/2018 Mizoguchi et al.
10,220,694 B2 3/2019 Mizoguchi et al.
11,217,836 B2 1/2022 Cha et al.
2004/0163398 A1* 8/2004 Morishita ........... H01M 10/633 62/186
2011/0059341 A1* 3/2011 Matsumoto ........ B60H 1/00978 429/82
2011/0229749 A1 9/2011 Kim et al.
2016/0129805 A1* 5/2016 Garfinkel ................ B60L 58/26 180/68.5
2016/0243919 A1* 8/2016 Yamanaka .......... H01M 10/613
2017/0271727 A1 9/2017 Ito et al.
2020/0076019 A1 3/2020 Ohkuma
2023/0035232 A1* 2/2023 Wang ................ H01M 10/6556
2023/0387496 A1* 11/2023 Azzouz ............... H01M 10/625
2024/0405323 A1* 12/2024 Kawabe .............. H01M 10/482
2025/0058622 A1* 2/2025 Chagarlamudi ....... B60K 11/08
2025/0070301 A1* 2/2025 Chagarlamudi .... H01M 10/625
2025/0070303 A1* 2/2025 Chagarlamudi .... H01M 10/625
2026/0045582 A1* 2/2026 Zhao ................. H01M 10/6555
2026/0112721 A1* 4/2026 Seonung ............. H01M 10/613

FOREIGN PATENT DOCUMENTS

CN 20604093 U 3/2017
JP 2007-66647 A 3/2007
JP 5853760 B2 2/2016
JP 6387422 B2 9/2018

* cited by examiner

*Primary Examiner* — Erez Gurari
(74) *Attorney, Agent, or Firm* — Jeremy J. Klobucar

(57) ABSTRACT

A vehicle active ram air system has a pan secured to the vehicle to direct an air flow. A battery wrap is positioned adjacent the pan to receive the air flow. A movable door is positioned to enable the air flow to pass into the battery wrap when the door is open. The door opens and closes based on a desired cooling air flow demand. An outlet enables the air flow to exit the battery wrap.

18 Claims, 3 Drawing Sheets

ACTIVE RAM AIR BATTERY WRAP

FIELD

The present disclosure relates to high voltage battery pack cooling and, more particularly, to an active ram air system cooling the batteries in the pack.

BACKGROUND

This section provides background information related to the present disclosure which is not necessarily prior art.

In high voltage battery packs, the cells or batteries in the battery packs should operate within a temperature range to ensure optimum performance during harsh drive cycles. Additionally, most electronic components require operation at acceptable temperature ranges.

Current cooling solutions do not provide for uniform temperature across the battery cells due to the localized effects of coolant flow, cold plate set ups or due to the presence of a heat source, like an exhaust adjacent the battery pack. The convection effects of a heat source add to the imbalance of the battery cells temperatures.

Currently, passive air is utilized to cool batteries that use natural convection to remove heat from the battery cells. Additionally, the cells may be cooled down or heated by a dedicated coolant loop that exchanges its heat with a chiller heat exchanger. The passive systems are insufficient and ineffective to quickly remove heat from the battery cells. A dedicated coolant loop or chiller, though widely used, needs dedicated heat exchangers which are extremely costly and inefficient to implement.

The present disclosure is positioned to utilize underbody cold ram air to cool the components like the HV battery, electronics, or electrical components that are located in the underbody or rear underbody regions of the vehicle. The inlet of the system is controlled by a battery thermal management system that senses the amount of air required to maintain the temperature of the components. The inlet is opened to enable the ram air flow to enter into the battery housing when needed. Also, the system utilizes an outlet at the rear of the battery housing to enable a 360° coverage of the battery cells, powered electronics or electrical components.

SUMMARY

This section provides a general summary of the disclosure, and is not a comprehensive disclosure of its full scope or all of its features.

According to a first aspect of the disclosure, a vehicle active ram air system comprises a pan secured to the vehicle to direct air flow. A battery wrap is positioned adjacent the pan to receive the air flow. A movable door is positioned to enable the air to flow into the battery wrap when the door is open. The door opens and closes based on a cooling air flow demand. An outlet enables the air flow to exit the battery wrap. The pan is a front belly pan with a kickup. The door is variably opened depending on a temperature of a battery cell positioned inside the wrap. The wrap includes a plurality of channels to move the air flow to dissipate heat from the batteries. The at least one cooling plate is positioned inside the wrap adjacent to the batteries. A plurality of fins are positioned between the at least one cooling plate and a wall of the wrap to define the channels. The at least one cooling plates surrounds the battery pack. The plurality of fins surrounds the at least one cooling plate and define channels surrounding the battery pack. A controller opens and closes the door based on a desired battery temperature within the wrap.

According to a second aspect of the disclosure, an electric vehicle battery cooling system comprises a pan secured to the vehicle to direct the air flow. A battery wrap is positioned adjacent the pan to receive the air flow. A movable door is positioned to enable the air flow into the battery wrap when the door is open. The door opens and closes based on a cooling air flow demand. A battery is positioned in the wrap. An outlet enables the air flow to exit the battery wrap. The pan is a front belly pan with a kickup. The door is variably opened depending on a temperature of a battery pack positioned inside the wrap. The wrap includes a plurality of channels to move the air flow to dissipate heat from the battery pack. The at least one cooling plate is positioned inside the wrap adjacent to the battery pack. A plurality of fins are positioned between the at least one cooling plate and a wall of the wrap to define the channels. The at least one cooling plate surrounds the battery pack. The plurality of fins surround the at least one cooling plate and define channels surrounding the battery pack. A controller opens and closes the door based on a desired battery temperature within the wrap.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
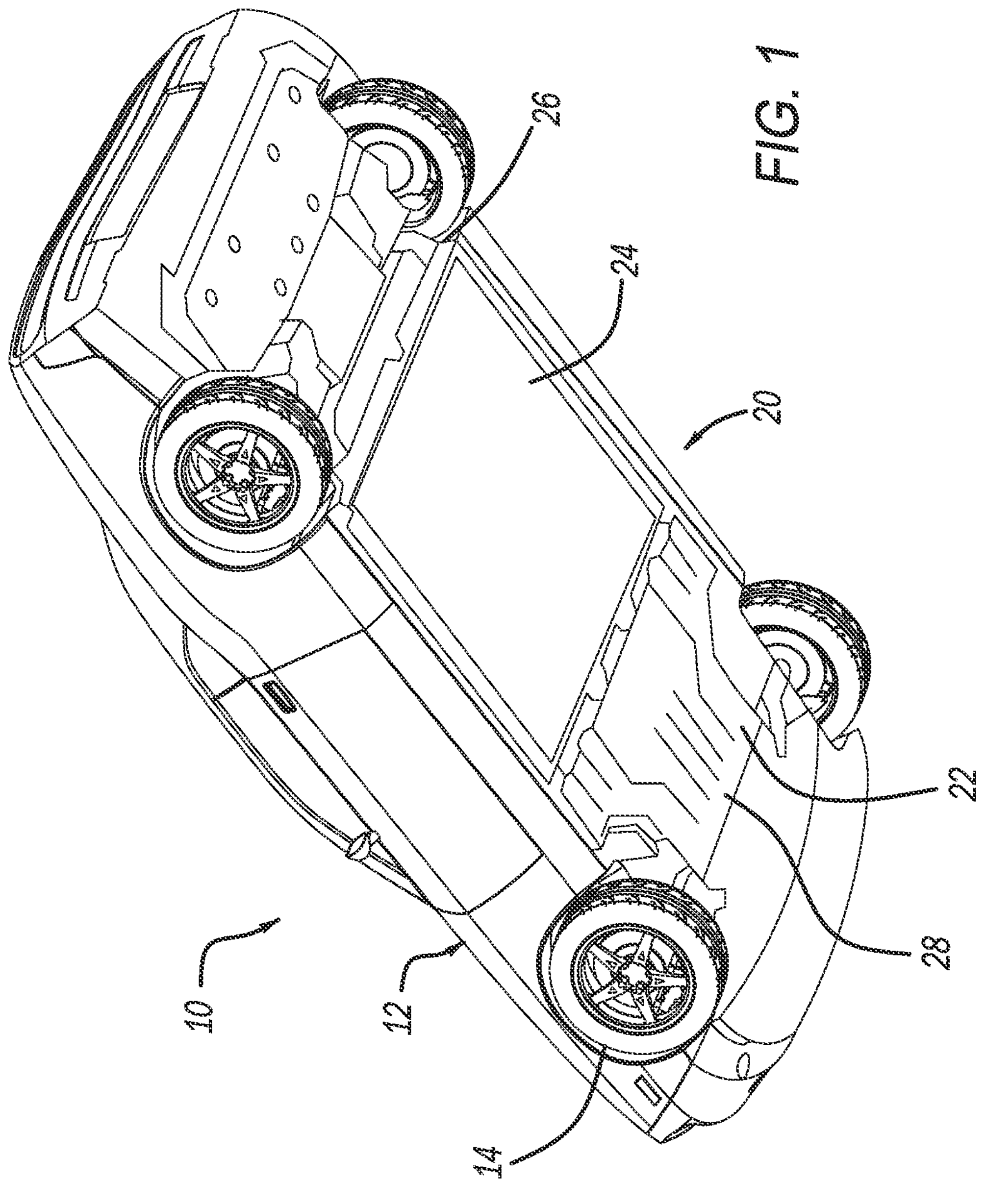
FIG. 1 is a perspective view of the underbody of a vehicle.
Figure 2:
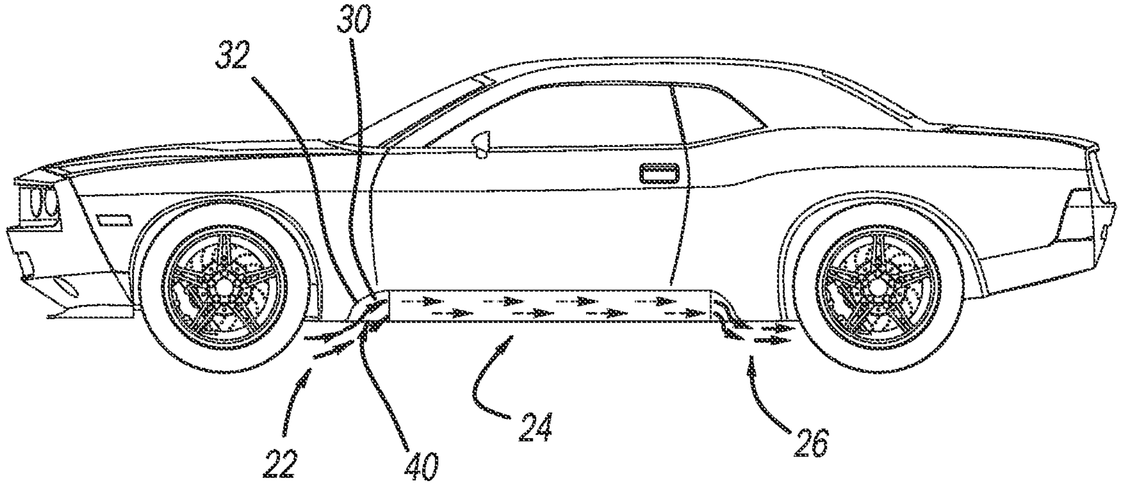
FIG. 2 is a schematic elevation view of the vehicle of FIG. 1.
Figure 3:
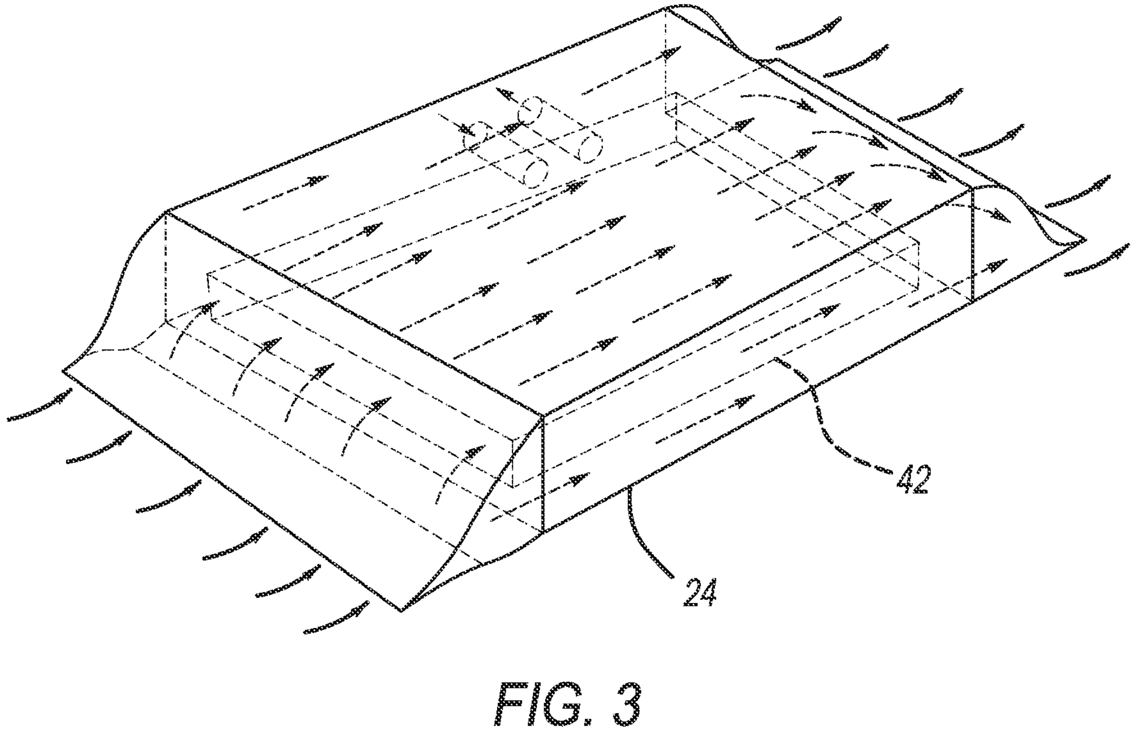
FIG. 3 is a schematic view of a battery wrap in accordance with the disclosure.

Example embodiments will now be described more fully with reference to the accompanying drawings.

Turning to the figures, a vehicle is illustrated and designated with the reference numeral 10. The vehicle includes a body 12 as well as wheels 14. The underside of the vehicle includes an active ram air wrap system 20. The system includes a belly pan 22, a wrap and an outlet 26.

The belly pan 22 or aerodynamic member includes a substantially flat pan 28 secured to the underbody of the vehicle. The pan 28 terminates into a kick up portion 30. The kick up portion 30 includes an arcuate pan portion 32 extending towards the top of the vehicle 10. The kick up portion 30 is positioned adjacent to the wrap 24. The kick up portion 30 extends to an inlet 32 positioned at the front of the wrap 24. The inlet 32 enables the ram air to enter into the wrap 24.

A movable door 40 extends between the pan 22 and the wrap 24. The door 40, in a closed position, prohibits the ram air flow from entering into the inlet 32. In an opened position, wherein the door 40 slides rearward into the wrap 24, the door 40 is open to enable the ram air to enter into the inlet 32 and subsequently into the wrap 24. The door 40 is controlled by a battery thermal management system or similar controller 45 that senses the amount of air required to maintain the temperature of the components within the wrap 24. The active door mechanism 40 closes or opens based on the cooling flow demand required. Thus, the thermal management system or controller 45 operates the door 40 to move it between an open and closed position. Thus, for example, on a cold day, when the cooling demand for the components is low, the door to the inlet 32 would remain shut. Then the door would open variably along its path to enable a desired amount of air to enter into the wrap 24 to a maximum fully opened door position.

Figure 4:
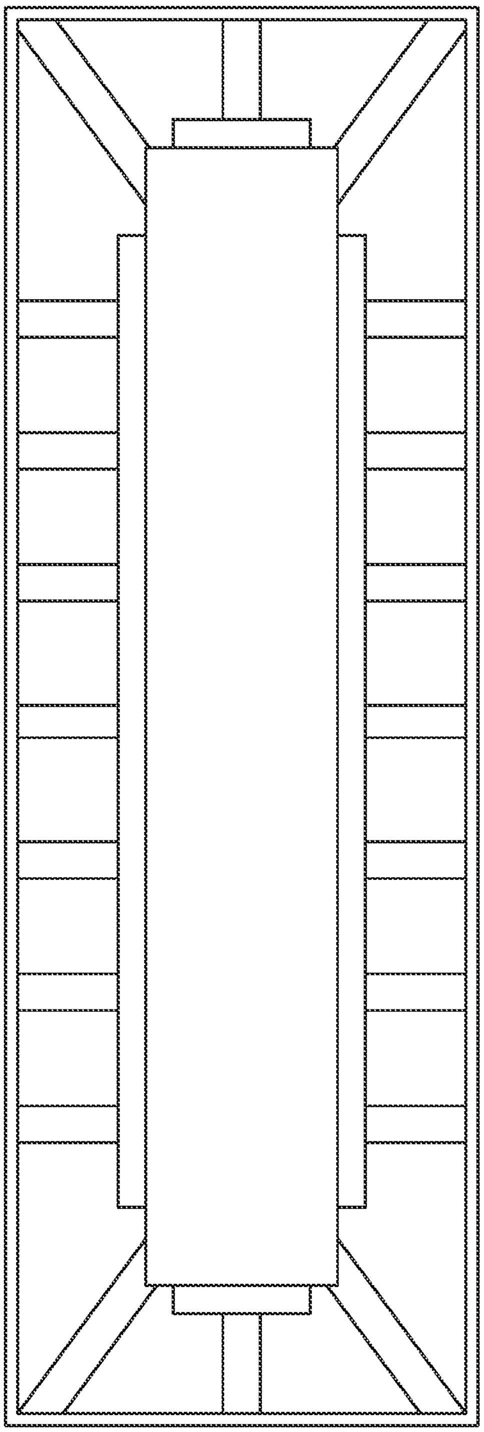
FIG. 4 is a schematic cross-section view of the battery wrap.

The wrap 24 is a housing covering a battery pack 42. The battery pack 42 is positioned inside of the housing or wrap 24. The system includes a cooling plate 44 surrounding the battery pack 42. The cooling plate 44 may include a plurality of plates positioned around the battery pack 42 as illustrated in FIG. 4.

A plurality of fins 46 are positioned between the cooling plates 44 and the housing wall 48 of the wrap 24. Thus, the fins 46, along with the wall 48 of the housing wrap 24, define channels 50 for directing the ram air flow through the wrap 24. The fins 46 are positioned adjacent the cooling plates 44 and are manufactured from a conductive material to dissipate the heat from the battery packs 50 to the channel 50 so that a surface area of the fins is contacted by the ram air to cool the battery pack. The fins 46 surround the battery pack 42 to provide channels 50 that surround the battery pack 42. Thus, this provides a supplemental active air cooling with high speed air flow with 360° coverage around the high voltage battery pack 42, electronic components while the vehicle is in motion. Thus, as air enters the wrap 24, it is directed around the battery pack 42 to provide a temperature range to ensure optimum performance during harsh drive cycles. Also, the temperature is substantially uniform across all the cells within the battery pack 42 due to the 360° coverage around the battery pack 42.

The outlet 26 is located at the rear or exit of the wrap 24. This enables the air flow to pass through the wrap 24 along the channels 50 without obstruction. The wrap 24 could include extending pieces at the outlet 26 to direct the flow to other components downstream of the battery pack 42.

Also, a smaller chiller or coolant loop could be present on the battery pack to assist in cooling if desirable.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A vehicle active ram air system comprising:

a pan secured to the vehicle for directing air flow;

a battery wrap positioned adjacent the pan for receiving the air flow;

a movable door positioned to enable the air flow to pass into the battery wrap when the door is open, the door opens and closes based on a cooling air flow demand; and an outlet for enabling the air flow to exit the battery wrap.

2. The vehicle active ram air system according to claim 1, wherein the pan is a front belly pan or aerodynamic member with a kickup.

3. The vehicle active ram air system according to claim 1, wherein the door is variably opened dependent on a desired temperature of a battery pack positioned inside the wrap.

4. The vehicle active ram air system according to claim 1, wherein the wrap includes a plurality of channels for moving the air flow to dissipate heat from a battery pack.

5. The vehicle active ram air system according to claim 1, wherein at least one cooling plate is positioned inside the wrap adjacent a battery pack.

6. The vehicle active ram air system according to claim 5, wherein a plurality of fins are positioned between the at least one cooling plate and a wall of the wrap.

7. The vehicle active ram air system according to claim 5, wherein the at least one cooling plates surrounds the battery pack.

8. The vehicle active ram air system according to claim 7, wherein a plurality of fins surrounds the at least one cooling plate and define channels surrounding a battery pack.

9. The vehicle active ram air system according to claim 1, further comprising a controller opening and closing the door based on a desired battery temperature.

10. An electric vehicle battery cooling system comprising:

a pan secured to the vehicle for directing air flow;

a battery wrap positioned adjacent the pan for receiving the air flow;

a movable door positioned to enable the air flow into the battery wrap when the door is open, the door opens and closed based on a desired cooling air flow demand;

a battery pack positioned in the battery wrap; and an outlet for enabling the air flow to exit the battery wrap.

11. The vehicle active ram air system according to claim 10, wherein the pan is a front belly pan with a kickup.

12. The vehicle active ram air system according to claim 10, wherein the door is variably opened dependent on a desired temperature of a battery pack positioned inside the wrap.

13. The vehicle active ram air system according to claim 10, wherein the wrap includes a plurality of channels for moving the air flow to dissipate heat from a battery pack.

14. The vehicle active air system according to claim 10, wherein at least one cooling plate is positioned inside the wrap adjacent a battery pack.

15. The vehicle active air system according to claim 14, wherein a plurality of fins are positioned between the at least one cooling plate and a wall of the wrap.

16. The vehicle active ram air system according to claim 14, wherein the at least one cooling plate surrounds the battery pack.

17. The vehicle active ram air system according to claim 16, wherein a plurality of fins surrounds the at least one cooling plate and define channels surrounding a battery pack.

18. The vehicle active air system according to claim 10, further comprising a controller opening and closing the door based on a desired battery temperature.

* * * * *